(12) United States Patent
Li et al.

(10) Patent No.: US 6,915,061 B2
(45) Date of Patent: Jul. 5, 2005

(54) VARIABLE OPTICAL ATTENUATOR WITH MEMS DEVICES

(75) Inventors: Wei-Zhong Li, San Jose, CA (US);
Wenhui Wang, Santa Clara, CA (US)

(73) Assignee: Oplink Communications, Inc., Fremont, CA (US)

( * ) Notice: Subject to any disclaimer, the term of this patent is extended or adjusted under 35 U.S.C. 154(b) by 111 days.

(21) Appl. No.: 10/407,062

(22) Filed: Apr. 2, 2003

(65) Prior Publication Data

US 2004/0091229 A1 May 13, 2004

Related U.S. Application Data

(63) Continuation-in-part of application No. 10/290,566, filed on Nov. 7, 2002, now abandoned.

(51) Int. Cl.[7] .............................. G02B 6/00; G02B 6/42
(52) U.S. Cl. ....................... 385/140; 385/16; 385/18; 385/31; 385/32; 385/33; 385/36
(58) Field of Search ............................. 385/16, 18, 31, 385/32, 33, 36, 140

(56) References Cited

U.S. PATENT DOCUMENTS 6,084,994 A * 7/2000 Li et al. ........................ 385/31
6,597,825 B1 * 7/2003 Yuan et al. .................... 385/16
6,694,073 B2 * 2/2004 Golub et al. .................. 385/18
6,781,730 B2 * 8/2004 Weaver et al. .............. 359/212

OTHER PUBLICATIONS

Andersen, et al., "MEMS Variable Optical Attenuator for DWDM Optical Amplifiers," OSA *Trends in Optics and Photonics (TOPS)*, vol. 37, *Optical Fiber Communication Conference*, Technical Digest Postconference Edition (Optical Society of America, Washington, DC, 2000), pp. 260–262.

* cited by examiner

*Primary Examiner*—Frank G. Font
*Assistant Examiner*—Mary El-Shammaa
(74) *Attorney, Agent, or Firm*—Fish & Richardson P.C.

(57) ABSTRACT

A variable optical attenuator includes a first lens, a MEMS device, a second lens, and a wedge. The first lens is configured to collimate an input light received on a first port and focus an output light on a focus point proximate to a second port. The MEMS device includes a reflection surface having a tilting angle thereof controllable by a control variable. The second lens has a focus point positioned proximate to the reflection surface of the MEMS device. The wedge is positioned between the first lens and the second lens and is configured to refract the input light received from the first lens to enter the second lens and refract the output light received from the second lens to enter the first lens.

25 Claims, 3 Drawing Sheets

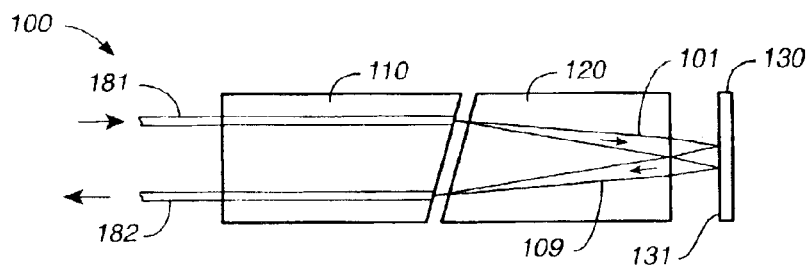
FIG._1a (PRIOR ART)
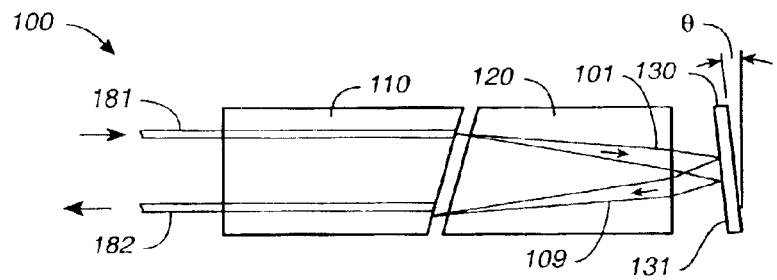
FIG._1b (PRIOR ART)
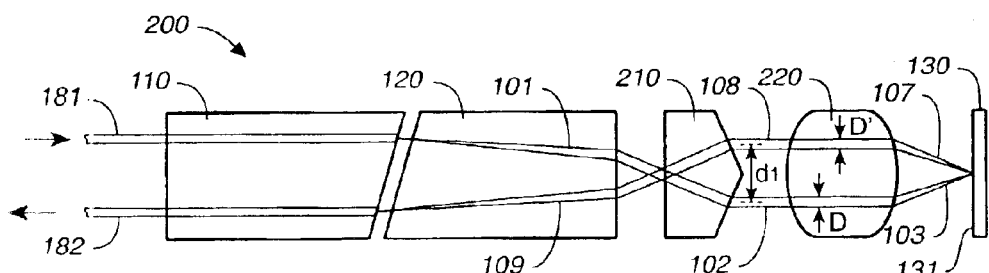
FIG._2a
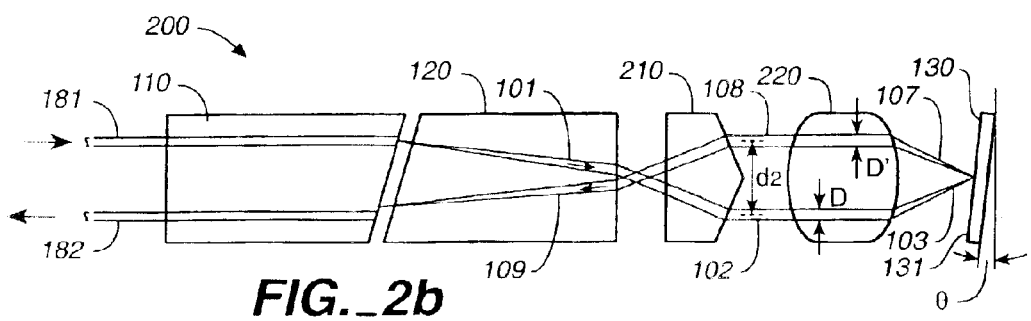
FIG._2b

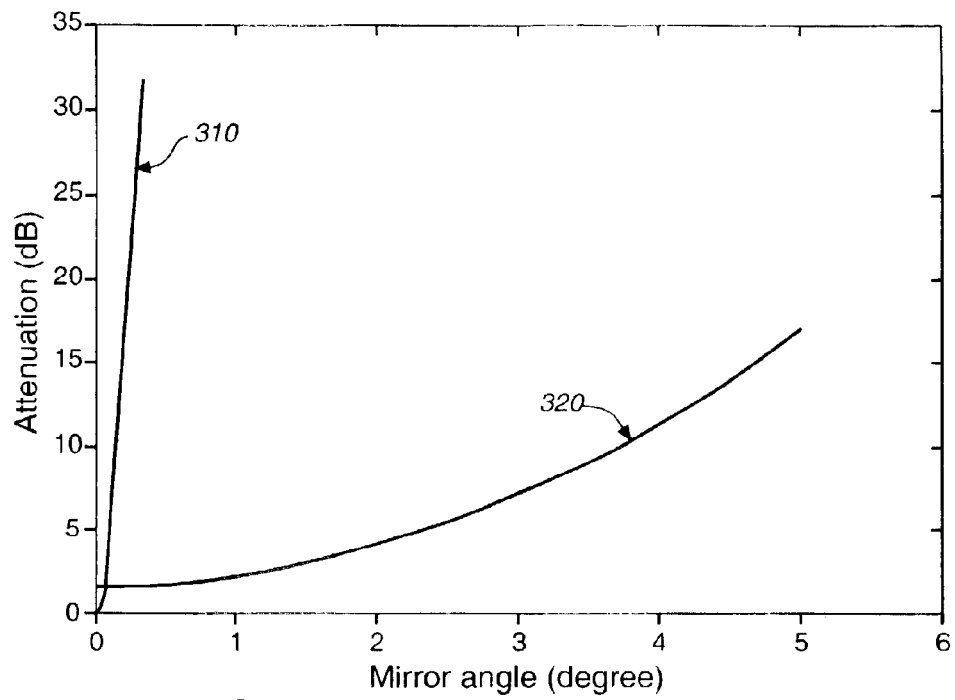
FIG._3
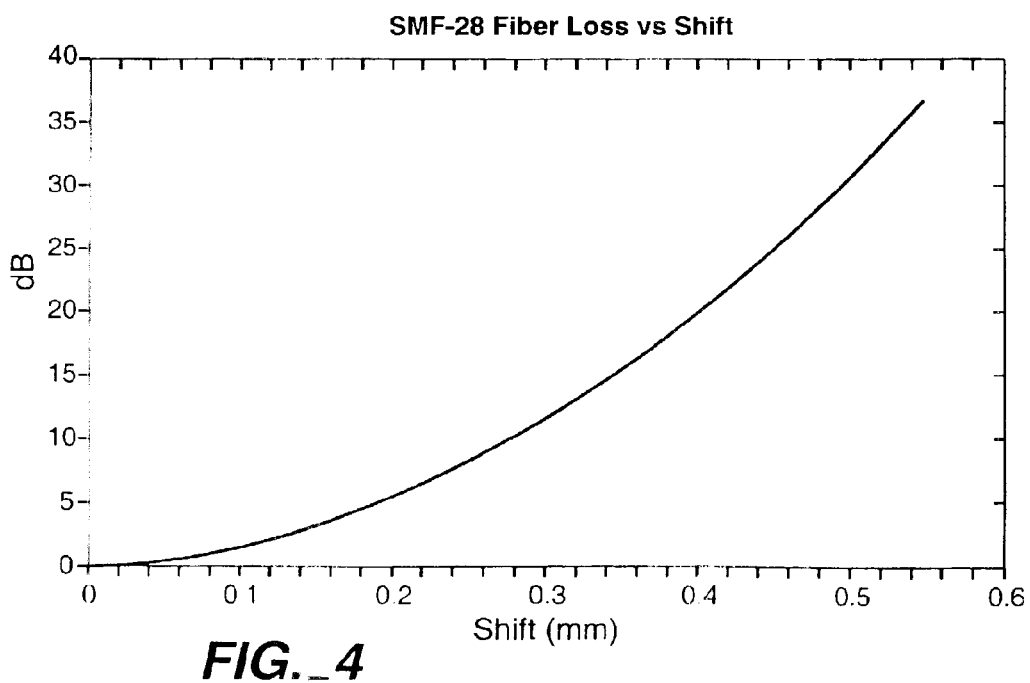
FIG._4

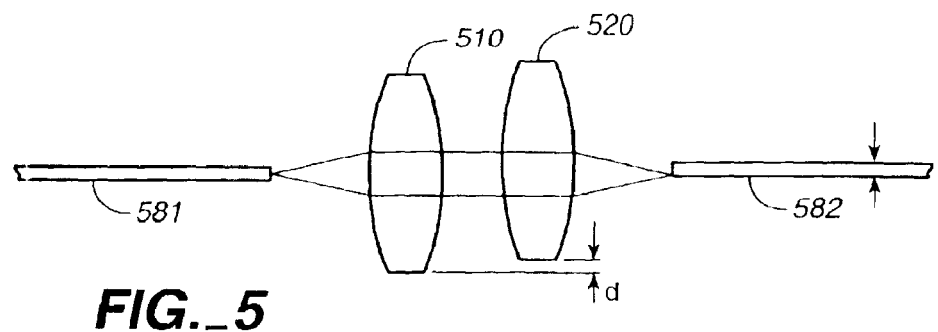
FIG._5
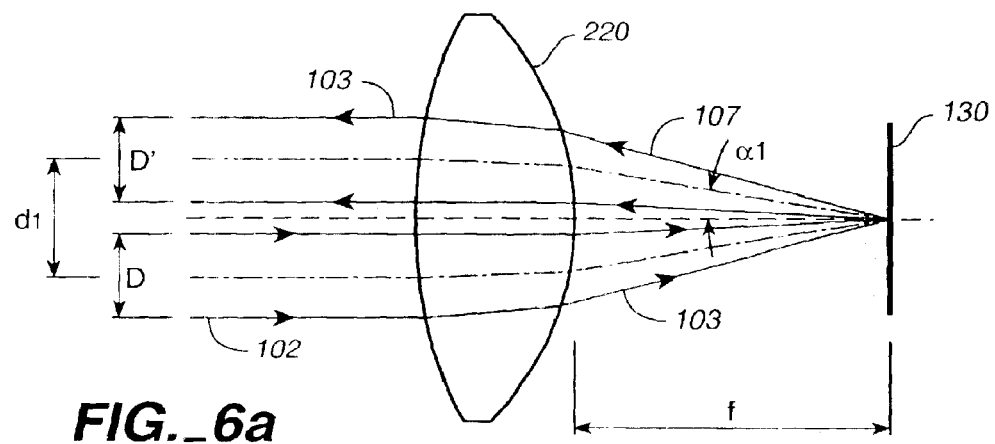
FIG._6a
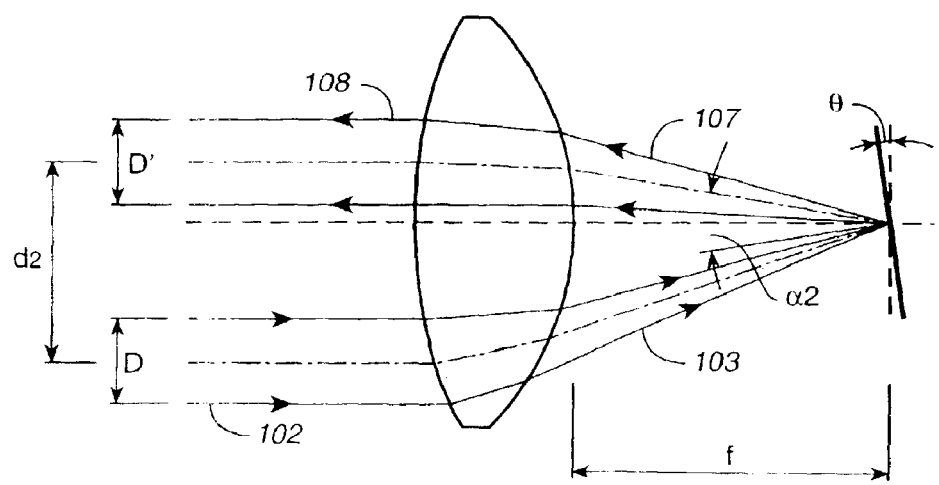
FIG._6b

VARIABLE OPTICAL ATTENUATOR WITH MEMS DEVICES

CROSS-REFERENCE

This application is a continuation-in-part application of U.S. application Ser. No. 10/290,566 filed on Nov. 7, 2002 now abandoned.

BACKGROUND OF THE INVENTION

The present invention relates generally to optical technology.

Variable optical attenuators are commonly used in optical communication systems and optical measurement systems. A variable optical attenuator (VOA) is a device that is generally designed to adjust the power ratio between a light beam exiting the device and a light beam entering the device over a variable range. Some variable optical attenuators can include Micro-Electro-Mechanical-System (MEMS) devices. A MEMS device generally includes one or more mirrors manufactured on a chip. A mirror on the MEMS device is generally in a tilting angle that can be controlled by a control variable, such as a voltage variable or a current variable.

FIGS. 1a and 1b (prior art) show a VOA 100 that includes a MEMS device 130. VOA 100 also includes a lens 120 and a holder 110 for holding an input fiber 181 and an output fiber 182. Light 101 exiting from input fiber 181 is collimated by lens 120 and is incident upon a reflection surface 131 of MEMS device 130. Light 101 is reflected by reflection surface 131 of MEMS device 130 and becomes light 109. Light 109 is focused by lens 120 to a focus point near the end of output fiber 182. When MEMS device 130 is in a first position, as shown in FIG. 1a, light 109 is focused by lens 120 such that essentially most of light 109 enters output fiber 182. When MEMS device 130 is in a second position with a tilting angle θ, as shown in FIG. 1b, light 109 is focused by lens 120 such that only part of light 109 enters output fiber 182.

SUMMARY OF THE INVENTION

In one aspect, the invention provides a variable optical attenuator. The variable optical attenuator includes a first lens, a MEMS device, a second lens, and a wedge. The first lens is configured to collimate an input light received on a first port and focus an output light on a focus point proximate to a second port. The MEMS device includes a reflection surface having a tilting angle thereof controllable by a control variable. The second lens has a focus point positioned proximate to the reflection surface of the MEMS device. The wedge is positioned between the first lens and the-second lens and is configured to refract the input light received from the first lens to enter the second lens and refract the output light received from the second lens to enter the first lens.

In another aspect, the invention provides a method for manufacturing a variable optical attenuator. The method includes the following steps: (1) the step of configuring a first lens to collimate an input light exiting from a first port and focus an output light on a focus point proximate to a second port; (2) the step of providing a MEMS device that includes a reflection surface having a tilting angle thereof controllable by a control variable; (3) the step of configuring a second lens to have a focus point thereof positioned proximate to the reflection surface of the MEMS device; (4) the step of positioning a wedge between the first lens and the second lens; and (5) the step of configuring the wedge to refract the input light received from the first lens to enter the second lens and refract the output light received from the second lens to enter the first lens.

In another aspect, the invention provides a method for changing the attenuation of light traveling from a first port to a second port in a variable optical attenuator. The attenuation is defined as the ratio between the power of an output light in the second port and the power of an input light in the first port. The method includes the following steps: (1) the step of providing a MEMS device that includes a reflection surface having a tilting angle thereof controllable by a control variable; (2) the step of collimating an input light received from the first port; (3) the step of refracting the input light after collimating the input light; (4) the step of focusing the input light on the reflection surface of the MEMS device after refracting the input light; (5) the step of reflecting the input light with the MEMS device as the output light; (6) the step of collimating the output light received from the MEMS device; (7) the step of refracting the output light after collimating the output light; and (8) the step of focusing the output light on a focus point proximate to the second port after refracting the output light.

Aspects of the invention may include one or more of the following advantages. Implementations of the present invention provide a VOA. The attenuation curve of the VOA can be designed according to applications of the VOA. The attenuation of the VOA can be designed to have better resolution, stability, reliability, and dynamic range. The VOA can also have reduced manufacturing costs. Other features and advantages of the invention will become apparent from the description, the drawings, and the claims.

BRIEF DESCRIPTION OF THE DRAWINGS

FIGS. 1a and 1b show a prior art variable optical attenuator that includes a MEMS device.

FIGS. 2a and 2b show a variable optical attenuator that includes a MEMS device.

FIG. 3 shows attenuation curves of variable optical attenuators that include a MEMS device.

FIG. 4 shows a simulated attenuation curve.

FIG. 5 shows an experiment for creating a simulated attenuation curve.

FIGS. 6a and 6b show that incident angles are related to the focus length of a second lens and the distances separating incoming and outgoing light beams.

DETAILED DESCRIPTION OF THE INVENTION

The present invention relates to an improvement in optical technology. The following description is presented to enable one of ordinary skill in the art to make and use the invention and is provided in the context of a patent application and its requirements. Various modifications to the invention will be readily apparent to those skilled in the art and the generic principals herein may be applied to other embodiments. Thus, the present invention is not intended to be limited to the embodiments shown, but is to be accorded the widest scope consistent with the principals and features described herein.

The present invention will be described in terms of a variable optical attenuator having specific components having specific configurations. Similarly, the present invention will be described in terms of components having specific relationships, such as distances or angles between components. However, one of ordinary skill in the art will readily recognize that the devices and systems described can include other components having similar properties, other configurations, and other relationships between components.

The implementations of the present invention provide VOAs that possess some improvements over VOA 100 in FIGS. 1a–1b.

The attenuation of VOA 100, defined as the ratio between the power of the light in output fiber 182 and the power of the light in input fiber 181, is a function of the tilting angle θ of MEMS device 130. FIG. 3 shows attenuation curve 310 associated with VOA 100. Attenuation curve 310 indicates that the attenuation of VOA 100 increases when the tilting angle θ increases. The attenuation of VOA 100 is 30 dB when the tilting angle θ is about 0.5 degrees.

The implementations of the-present invention provide a VOA device that may include the advantage that the attenuation curve of the device can be designed according to its applications. For example, FIG. 3 also shows an attenuation curve 320 associated with a VOA 200 according to an implementation of the present invention. Attenuation curve 320 indicates that the attenuation of the VOA is approximately 17 dB when the tilting angle θ is 5 degrees.

In one implementation, FIGS. 2a–2b show a VOA 200 that includes a MEMS device 130. Like VOA 100 in FIGS. 1a–1b, VOA 200 also includes a first lens 120, and a holder 110 for holding an input fiber 181 and an output fiber 182. In addition, VOA 200 also includes a wedge 210 and a second lens 220 both positioned between lens 120 and MEMS device 130. First lens 120 can be a GRIN lens. Second lens 220 can also be a GRIN lens.

First lens 120 is configured and positioned to collimate optical signals exiting from the end of input fiber 181. First lens 120 is also configured and positioned to focus optical signals to enter the end of output fiber 182. Wedge 210 is configured and positioned to change the traveling direction of the light passing through the wedge. Second lens 220 is configured and positioned in such a way that the focus point of second lens 220 is essentially on the reflection surface of MEMS device 130. The tilting angle θ of the reflection surface 131 of MEMS device 130 can be controllable by a control variable, such as a voltage variable or a current variable.

Light 101 exiting from input fiber 181 is collimated by first lens 120 and is refracted by wedge 210 as light 102. Light 102 is in the form of a light beam with a beam diameter D. Light 102 is focused by second lens 220 and becomes light 103. Light 103, with a focus point essentially on the reflection surface 131 of MEMS device 130, is incident upon MEMS device 130.

Light 103 is reflected by MEMS device 130 and becomes light 107. Light 107 is collimated by second lens 220 and becomes light 108. Light 108 is in the form of a light beam with a beam diameter D'. Light 108 is refracted by wedge 210 and becomes light 109. Light 109 is then focused by lens 120 to a focus point that is essentially near the end of output fiber 182.

Light 102 and light 108 are both in the form of light beams. The center of the two light beams is separated by a distance that depends on the tilting angle of MEMS device 130. When MEMS device 130 is in a first position, as shown in FIG. 2a, the center of the two light beams is separated by a first distance $d_1$, and light 109 is focused by first lens 120 such that essentially most of light 109 enters output fiber 182. When MEMS device 130 is in a second position with a tilting angle θ, as shown in FIG. 2b, the center of the two light beams is separated by a second distance $d_2$, light 109 is focused by lens 120 such that only part of light 109 enters output fiber 182.

When MEMS device 130 is in the first position, the attenuation of VOA 200, defined as the ratio between the power in output fiber 182 and the power in input fiber 181, is minimized. The attenuation of VOA 200 increases as the differences between the first distance $d_1$ and the second distance $d_2$ increases. The attenuation of VOA 200 generally is a function of $d_2-d_1$.

FIG. 4 illustrates a simulated attenuation curve that shows the attenuation versus the distance differences $d_1-d_2$. The simulated attenuation curve was created in an experiment as shown in FIG. 5. FIG. 5 shows that two SMF-28 fibers 581 and 582 are respectively coupled to two collimators 510 and 520. The two collimators 510 and 520 are aligned to obtain minimal loss, and the power coupled from fiber 581 to fiber 582, defined as a reference power, is recorded. Then, fiber 582 and collimator 520 is shifted with respect to fiber 581 and collimator 510. The power coupled from fiber 581 to fiber 582, defined as a coupled power, is recorded as a function of the shifted distance d between the two collimators. The attenuation, defined as the ratio between the coupled power and the reference power, is drawn in FIG. 4 as a function of the shifted distance d. The drawing in FIG. 4 provides a simulated attenuation curve for a possible design of VOA 200 that uses two SMF-28 fibers.

The simulated attenuation curve in FIG. 4 generally simulates the attenuation of VOA 200 as a function of $d_2-d_1$. Because $d_2-d_1$ is a function of the tilting angle θ, the simulated attenuation curve in FIG. 4 can also simulate the attenuation of VOA 200 as a function of the tilting angle θ.

FIGS. 6a and 6b show that $d_2-d_1$ is generally related to the tilting angle θ. FIG. 6a shows that incident angle $\alpha_1$ is related to the first distance $d_1$ and the focus length f of second lens 220. More specifically, in the small incidental angle limit, $\alpha_1=d_1/2f$. FIG. 6b shows that incident angle $\alpha_2$ is related to the second distance $d_2$ and the focus length f of second lens 220. More specifically, in the small incidental angle limit, $\alpha_2=d_2/2f$. The incident angles $\alpha_1$ and $\alpha_2$ are related to the tilting angle θ by equation, $\theta=\alpha_2-\alpha_1$. Therefore, $d_2-d_1$ is related to the tilting angle θ by equation $d_2-d_1=2f\theta$.

In one implementation, $d_1=0.65$ mm and $f=2.86$ mm, when θ=5 degrees and $d_2-d_1=0.5$ mm. As shown in FIG. 4, if two SMF-28 fibers are used in VOA 200, when the θ=5 degrees, $d_2-d_1=0.5$ mm, the attenuation of VOA 200 is expected to be about 30 dB.

The focus length f of second lens 220 can be selected to optimize the attenuation curve of VOA 200. For example, by selecting the focus length f, the attenuation curve of VOA 200 can be optimized such that the attenuation is equal to a selected value (e.g., 30 dB, 25 dB, et al.) when the tilting angle θ is at 5 degrees.

VOA 200 has the advantage that the attenuation curves of VOA 200 can be designed according to the applications of VOA 200. Comparing with VOA 100, VOA 200 can also have the advantage that MEMS devices with a smaller reflection area can be used. In VOA 100, as shown in FIGS. 1a–1b, light 101 is incident directly on the reflection surface of MEMS device 130. In VOA 200, as shown in FIGS. 2a–2b, light 107 is focused first by second lens 220 before it is incident on the reflection surface of MEMS device 130. Therefore, the reflection area of the MEMS device in VOA 200 can be smaller than the reflection area of the MEMS device in VOA 100. MEMS devices with a smaller reflection area can be less expensive.

A method and system has been disclosed for providing variable optical attenuators. Although the present invention has been described in accordance with the implementations shown, one of ordinary skill in the art will readily recognize that there could be variations to the implementations and those variations would be within the spirit and scope of the present invention. Accordingly, many modifications may be made by one of ordinary skill in the art without departing from the spirit and scope of the appended claims.

What is claimed is:

1. A variable optical attenuator comprising:
    a first lens configured to collimate an input light received on a first port and focus an output light on a focus point proximate to a second port;
    a MEMS device including a reflection surface having a tilting angle thereof controllable by a control variable, the MEMS device being operable to variably attenuate an amount of light exiting the variable optical attenuator including adjusting the tilting angle;
    a second lens having a focus point positioned proximate to the reflection surface of the MEMS device; and
    a wedge positioned between the first lens and the second lens and configured to refract the input light received from the first lens to enter the second lens and refract the output light received from the second lens to enter the first lens.

2. The variable optical attenuator of claim 1 wherein the first port receives an end of an input fiber and the second port receives an end of an output fiber.

3. The variable optical attenuator of claim 2 further comprising a holder for holding the input fiber and the output fiber.

4. The variable optical attenuator of claim 3 wherein the holder is a capillary.

5. The variable optical attenuator of claim 1 wherein the reflection surface of the MEMS device is configurable to be in a first position such that substantially all of the output light from the first lens enters the second port.

6. The variable optical attenuator of claim 1 wherein the reflection surface of the MEMS device is configurable to be in a second position such that part of the output light from the first lens enters the second port.

7. The variable optical attenuator of claim 1 wherein the first lens is a GRIN lens.

8. The variable optical attenuator of claim 1 wherein the second lens is a GRIN lens.

9. The variable optical attenuator of claim 1 wherein the first lens having a focus length selected to optimize an attenuation curve.

10. The variable optical attenuator of claim 1 wherein the second lens having a focus length selected to optimize an attenuation curve.

11. The variable optical attenuator of claim 1 wherein the tilting angle of the reflection surface on the MEMS device is controllable by a voltage.

12. The variable optical attenuator of claim 1 wherein the tilting angle of the reflection surface on the MEMS device is controllable by a current.

13. A method for manufacturing a variable optical attenuator comprising:
    configuring a first lens to collimate an input light exiting from a first port and focus an output light on a focus point proximate to a second port;
    providing a MEMS device that includes a reflection surface having a tilting angle thereof controllable by a control variable, the MEMS device being operable to variably attenuate an amount of light exiting the variable optical attenuator including adjusting the tilting angle;
    configuring a second lens to have a focus point thereof positioned proximate to the reflection surface of the MEMS device; and
    positioning a wedge between the first lens and the second lens; and
    configuring the wedge to refract the input light received from the first lens to enter the second lens and refract the output light received from the second lens to enter the first lens.

14. The method of claim 13 further comprising positioning the end of an input fiber as a first port and positioning the end of an output fiber as a second port.

15. The method of claim 13 further comprising configuring a holder to hold the input fiber and the output fiber.

16. The method of claim 15 wherein the step of configuring a holder includes configuring a capillary to hold the input fiber and the output fiber.

17. The method of claim 13 further comprising configuring the reflection surface of the MEMS device operable in a first position such that substantially all of the output light from the first lens enters the second port.

18. The method of claim 13 further comprising configuring the reflection surface of the MEMS device operable in a second position such that a portion of the output light from the first lens enters the second port.

19. The method of claim 13 further comprising providing a GRIN lens as the first lens.

20. The method of claim 13 further comprising providing a (GRIN lens as the second lens.

21. The method of claim 13 further comprising selecting a focus length of the first lens to optimize an attenuation curve.

22. The method of claim 13 further comprising selecting a focus length of the second lens to optimize an attenuation curve.

23. A method for changing an attenuation of light traveling from a first port to a second port in a variable optical attenuator, the method comprising:
    providing a MEMS device that includes a reflection surface having a tilting angle thereof controllable by a control variable;
    collimating an input light received from the first port;
    refracting the input light after collimating the input light;
    focusing the input light on the reflection surface of the MEMS device after refracting the input light;
    reflecting an attenuated amount of the input light with the MEMS device as the output light including adjusting the tilting angle, the attenuation being a ratio between a power of the output light in a second port and a power of an input light in the first port;
    collimating the output light received from the MEMS device;
    refracting the output light after collimating the output light; and
    focusing the output light on a focus point proximate to the second port after refracting the output light.

24. The method of claim 23 farther comprising configuring the reflection surface of the MEMS device in a first position such that substantially all of the output light enters the second port after focusing the output light on a focus point proximate to the second port.

25. The method of claim 24 further comprising configuring the reflection surface of the MEMS device in a second position such that a portion of the output light enters the second port after focusing the output light on a focus point proximate to the second port.

* * * * *